United States Patent [19]

Finzel

[11] Patent Number: 5,347,602
[45] Date of Patent: Sep. 13, 1994

[54] A DEVICE FOR BENDING A LIGHT WAVEGUIDE TO DETECT SIGNAL THEREIN

[75] Inventor: Lothar Finzel, Unterschleissheim, Fed. Rep. of Germany

[73] Assignee: Siemens Aktiengesellschaft, Munich, Fed. Rep. of Germany

[21] Appl. No.: 25,134

[22] Filed: Mar. 2, 1993

[30] Foreign Application Priority Data

Mar. 4, 1992 [DE] Fed. Rep. of Germany ....... 4206814

[51] Int. Cl.$^5$ ............................................... G02B 6/26
[52] U.S. Cl. ............................................ 385/25; 385/32; 385/27; 385/28; 385/42
[58] Field of Search .................... 385/25, 9, 26, 27, 28, 385/32, 39, 40, 41, 42, 43, 44, 13, 48

[56] References Cited

U.S. PATENT DOCUMENTS

| | | | |
|---|---|---|---|
| 4,671,653 | 6/1987 | So et al. | 356/73.1 |
| 4,950,046 | 8/1990 | Hughes et al. | 350/96.18 |
| 4,983,007 | 1/1991 | James et al. | 385/32 |
| 5,039,188 | 8/1991 | Williams | 385/32 |
| 5,040,866 | 8/1991 | Engel | 385/32 |

FOREIGN PATENT DOCUMENTS 3537342  5/1987  Fed. Rep. of Germany .
WO92/01961  2/1992  PCT Int'l Appl. .

OTHER PUBLICATIONS

Sales Brochure entitled "AFD-100", BIT Instrument Ltd., York, United Kingdom, 1990, Mar.

*Primary Examiner*—Rodney B. Bovernick
*Assistant Examiner*—Phan Thi Heartney
*Attorney, Agent, or Firm*—Hill, Steadman & Simpson

[57] ABSTRACT

A light waveguide signal detector enables testing for the transmission of a signal in a light waveguide without disturbing the transmission of the signal. The light waveguide signal detector comprises a base part having a pressure trough lined with an optically transparent material, at least one light receiver being arranged under the elastic material, a pressure part for deflecting the light waveguide to obtain an emergence of a light signal therefrom and a light covering for protecting against stray light surrounding a portion of the pressure part which engages the optical fiber.

14 Claims, 2 Drawing Sheets

A DEVICE FOR BENDING A LIGHT WAVEGUIDE TO DETECT SIGNAL THEREIN

BACKGROUND OF THE INVENTION

The present invention is directed to a light waveguide signal detector with which the presence of the optical signals in the light waveguide can be determined.

Bit Instruments Limited, Clifton Technology Centre, Clifton Moor Gate, York Y03 8XF, United Kingdom sells an active fiber detector which works based on The principle of light outfeed by a fiber excursion or bending. However, in these devices so much light is outfed that the data exchange is disturbed during testing. These devices couple different amounts of light out dependent on the bending sensitivity of the light waveguide. In addition, the light waveguide optical fiber is highly stressed by the relatively small bending radius.

SUMMARY OF THE INVENTION

The object of the present invention is to provide a light waveguide signal detector with which the light waveguide optical fiber is less mechanically stressed and with which the outfed light is limited to a minimal required quantity so that the signal transmission is not disturbed.

To accomplish these objects, the present invention is directed to a light waveguide signal detector which comprises a base part having a pressure trough lined with an optically transparent, elastic material, the base part has at least one light receiver arranged under the elastic material, a pressure part fits into the pressure trough and the pressure part is rounded on at least one side and an elastic covering covers at least a part of the pressure part facing towards the pressure trough to shield a light waveguide fiber proceeding between a light covering and the elastic material against external light. Preferably, the pressure trough has a shape of an obtuse angle V-channel, the elastic material is a transparent silicone material, the pressure part can have different radii, a hose is provided as a light covering and that the base member will have at least one slot for providing guidance for the light waveguide fiber that extends transversely relative to the longitudinal direction of the V-channel forming the pressure trough.

The deflection or sag of the light waveguide the elastic material is advantageous. As a result of this bending or deflection, mechanical stresses will be minimized so that the fiber is not exposed to excessively high pressure. In addition, only the non-elastic pressure parts must be replaced in order to achieve different bending radii so that fibers having different bending sensitivities can be tested. Only the quantity of light needed for recognition of the operation is always coupled out. Thus, the operation is not interrupted by the testing.

The non-elastic pressure parts respectively prescribe the minimum bending radius whereas the elastic material will adapt. An unintentional light incident is avoided with the elastic, opaque light covering so that work can be carried out with minimum quantities for the light outfeed and still provide a great signal to noise ratio.

Other advantages and features of the invention will be readily apparent from the following description of the preferred embodiments, the claims and drawings.

DESCRIPTION OF THE PREFERRED EMBODIMENTS

Figure 1:
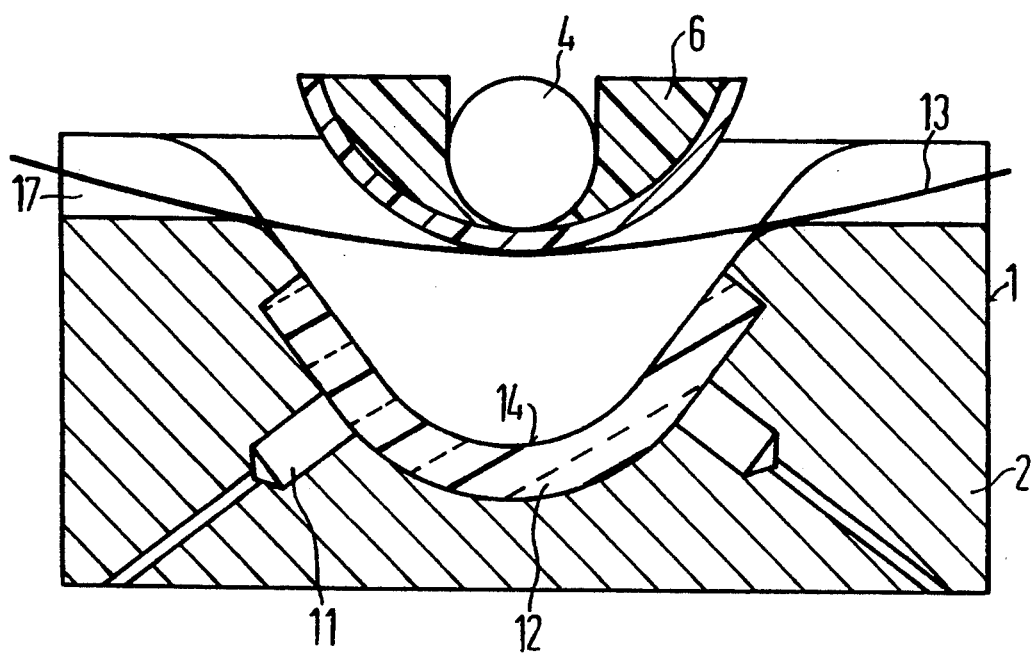
FIG. 1 is a schematic cross-sectional view of a light waveguide signal detector in accordance with the present invention.

The principles of the present invention are particularly useful in a light waveguide signal detector which is schematically illustrated in FIG. 1 and generally indicated at 1. The light waveguide signal detector 1, which is referred to an a LWG signal detector, has a base part 2 that has a pressure channel or trough 14 which is lined with a transparent, elastic material 12. For example, the transparent silicone material is suitable for this purpose. Two light-sensitive optoelectronic transducers, such as light receivers 11, are arranged under the elastic material 12. A flex part or pressure part 4, which is at least partially surrounded by an elastic light covering 6, is pressed into the trough 14 which is lined with the silicone material 12. The flex part 4 is rounded on at least one side facing the trough 14 so that a light waveguide fiber 13 situated between the base part and the pressure part will assume the bending radius of the pressure part 4. Pressure parts, which each have a different bending radius, can be utilized in conformity with the fiber properties. Likewise, a pressure part can be employed that has a plurality of portions with different bending radii. In practice, 2 through 3 different radii are always sufficient.

As soon as the light waveguide fiber 13 is pressed into the pressure trough 14, a disturbing light incidence for the signal receiver is prevented by the light covering 6. In order to avoid lateral incident stray light which would come from the front or the back of FIG. 1, the channel is likewise covered at its front and back openings. To aid in guiding the fiber 13, at least one slot 17 is provided for receiving the fiber to position it prior to being bent into the trough 14.

Figure 2:
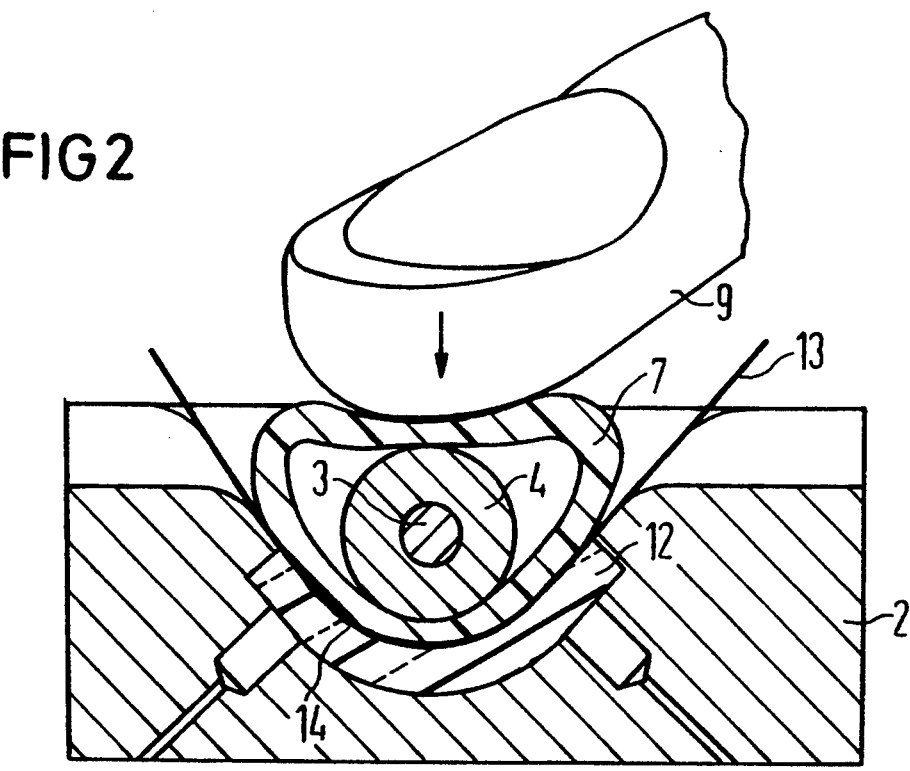
FIG. 2 is a cross-sectional view of a specific embodiment of light waveguide signal detector in accordance with the present invention.

A specific embodiment of the light waveguide signal detector is illustrated in FIG. 2. In this embodiment, a hose 7 is provided as the light covering and this surrounds the pressure part 4 that is executed as a cylinder. The pressing occurs with a finger tip 9 that will simultaneously deform the hose so that the elastic material 12 is completely shielded against incident light. A guide part 3 telescopically receives the pressure part 4 to ensure an exact matching of the pressure part in the base part 2.

Figure 3:
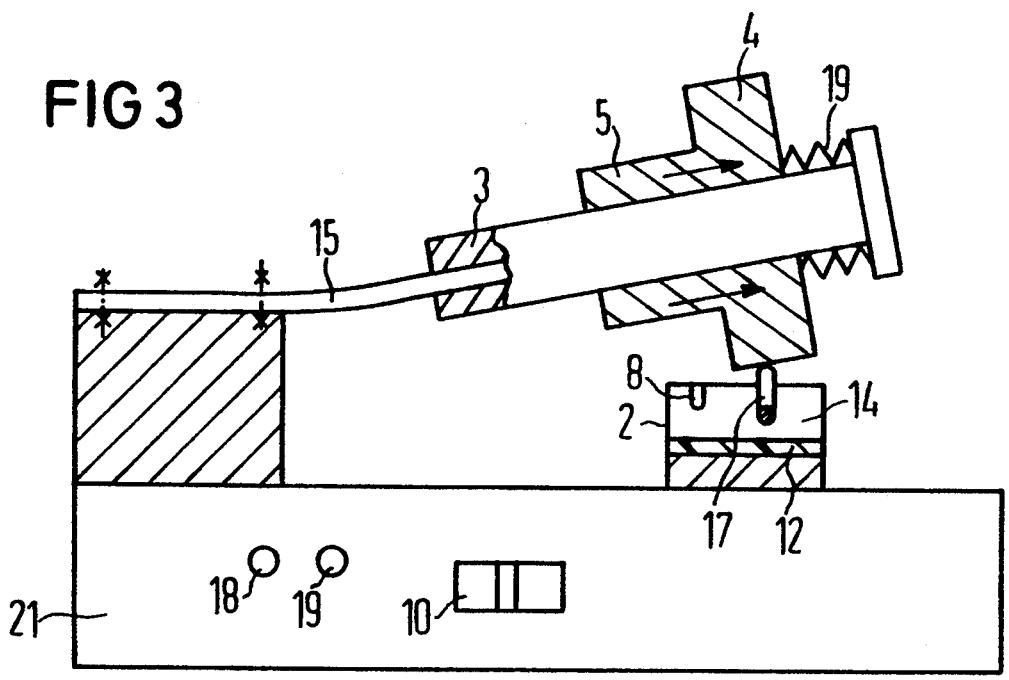
FIG. 3 is an exemplary embodiment with portions broken away and removed for purposes of illustration of the light waveguide signal detector.

As illustrated in FIG. 3, the light waveguide fiber detector will have a housing 21 which receives an operating switch 10, an operating display 18 and a signal display 19. In addition, electronic circuits are received within the housing 21. The pressure part 4 is arranged and is displaceable on the guide part 3 in this embodiment so that the testing can be selectively carried out with a large bending radius or given utilization of small flex sleeve or portion 5 by displacing the pressure part against a spring 19, as indicated by arrows, to position the small bending radius portion 5 for applying the pressure. A restoring spring 19 ensures that the test always begins with the larger bending radius of the portion 4. The guide part 3 connected to the housing 21 or an extension of the housing by a leaf spring 15 which will prevent lateral movement. In an alternative to an displaceable or rotatable pressure part 4, additional slots can be provided in the base part 2 as illustrated by a slot 8. Thus, a portion of the part 4 having a different bending radius can be allocated to this additional part 8.

The moving direction of the pressure part 4, of course, can be also ensured linearly as in the recited prior art.

Although various minor modifications may be suggested by those versed in the art, it should be understood that I wish to embody within the scope of the patent granted hereon all such modifications as reasonably and properly, within the scope of my contribution to the art.

I claim:

1. A light waveguide signal detector comprising a base part having a pressure trough lined with an optically transparent, elastic material for receiving a light waveguide fiber to be tested; at least one light receiver being arranged in the base part under the transparent elastic material; a pressure part fitting into the pressure trough to hold the fiber in a curved path on the transparent elastic material, said pressure part being rounded on at least one side; and Unitary means having an opaque, elastic surface engaging said fiber and conformable to said pressure trough for simultaneously shielding a portion of the fiber in the curved path from external light and for elastically pressing said portion of the fiber in said curved path against said transparent elastic material.

2. A light waveguide signal detector according to claim 1, which includes at least one slot being provided in the base for guiding the light waveguide fiber transversely relative to a longitudinal direction of the pressure trough.

3. A light waveguide signal detector according to claim 1, wherein the light covering is a hose receiving the pressure part.

4. A light waveguide signal detector according to claim 1, wherein the pressure part comprises portions with different radii.

5. A light waveguide signal detector according to claim 4, wherein the light covering is a hose receiving the pressure part having portions with different radii.

6. A light waveguide signal detector according to claim 4, wherein the base part is provided with at least one slot for guiding the light waveguide fiber to extend transversely relative to a longitudinal direction of the pressure trough.

7. A light waveguide signal detector according to claim 1, wherein the elastic material is a transparent silicone material.

8. A light waveguide signal detector according to claim 1, wherein the pressure trough in the base part comprises an obtuse-angle V-channel.

9. A light waveguide signal detector according to claim 8, wherein the elastic material is a transparent silicone material.

10. A light waveguide signal detector according to claim 9, wherein the light covering is a hose which receives the pressure part.

11. A light waveguide signal detector according to claim 9, wherein the pressure part comprises portions with different radii.

12. A light waveguide signal detector according to claim 11, wherein the light covering is a hose receiving the pressure part having different radii.

13. A light waveguide signal detector according to claim 12, wherein the base part has at least one slot extending transversely relative to a longitudinal direction of the V-channel for guiding the light waveguide fiber across the pressure trough.

14. A light waveguide signal detector according to claim 8, wherein the base part has at least one slot extending transverse to a longitudinal direction of the V-channel for guiding the light waveguide fiber transversely relative to the pressure trough.

* * * * *